(12) United States Patent
Kleinbongartz et al.

(10) Patent No.: US 9,541,187 B2
(45) Date of Patent: Jan. 10, 2017

(54) TRANSMISSION, IN PARTICULAR FOR DRIVE SYSTEMS OF CONSTRUCTION MACHINES AND MINING MACHINES

(71) Applicant: CATERPILLAR GLOBAL MINING EUROPE GMBH, Lünen (DE)

(72) Inventors: Tobias Kleinbongartz, Dinslaken (DE); Adam Gacka, Witten (DE); Alexander Jänsch, Sudkirchen (DE); Andreas Scheer, Werne (DE); Dennis Grimm, Nordkirchen (DE); Jessica Johnson, Lünen (DE); Michael Nafe, Holzwickede (DE); Peter Pientka, Datteln (DE); Thomas Hoelken, Berghamen (DE)

(73) Assignee: Caterpillar Global Mining Europe GmbH, Lünen (DE)

( * ) Notice: Subject to any disclaimer, the term of this patent is extended or adjusted under 35 U.S.C. 154(b) by 76 days.

(21) Appl. No.: 14/397,362

(22) PCT Filed: Apr. 23, 2013

(86) PCT No.: PCT/EP2013/001209
§ 371 (c)(1),
(2) Date: Oct. 27, 2014

(87) PCT Pub. No.: WO2013/159905
PCT Pub. Date: Oct. 31, 2013

(65) Prior Publication Data
US 2015/0094187 A1    Apr. 2, 2015

(30) Foreign Application Priority Data
Apr. 25, 2012    (DE) .................... 20 2012 101 546 U

(51) Int. Cl.
*F16H 57/02*    (2012.01)
*F16H 57/08*    (2006.01)
(Continued)

(52) U.S. Cl.
CPC ......... *F16H 57/02004* (2013.01); *F16C 17/08* (2013.01); *F16H 1/46* (2013.01);
(Continued)

(58) Field of Classification Search
CPC .. F16H 57/02004; F16C 17/08; F16C 2361/61
See application file for complete search history.

(56) References Cited

U.S. PATENT DOCUMENTS

| | | | | |
|---|---|---|---|---|
| 53,026 A | * | 3/1866 | Mead | F16C 17/08 16/DIG. 27 |
| 1,667,156 A | * | 4/1928 | Holmes | E21B 3/02 173/140 |

(Continued)

FOREIGN PATENT DOCUMENTS

| | | |
|---|---|---|
| DE | 43 16 798 A1 | 12/1994 |
| DE | 196 02 926 C1 | 5/1997 |
| DE | 10 2008 050187 A1 | 4/2010 |
| EP | 0 188 616 A1 | 7/1986 |
| EP | 1 645 761 A2 | 4/2006 |
| GB | 113 261 A | 8/1918 |

OTHER PUBLICATIONS

International Search Report from Application No. PCT/US2013/001209; filed Apr. 23, 2013.

*Primary Examiner* — Sherry Estremsky

(57) ABSTRACT

The present disclosure generally refers to a transmission comprising a transmission housing and at least one transmission stage arranged in the transmission housing. The transmission stage may include, coaxially with respect to an axis, a sun gear, a planet carrier with at least two planet gears rotatably mounted on the planet carrier; and an internal gear as transmission parts. At least one stop means may be provided for limiting the axial movement of two transmis- (Continued)

sion parts which are movable relative to one another. The stop means may comprise a ball pair with a first ball assigned to a first transmission part and a second ball assigned to a second transmission part. The two balls may be arranged so as to be rotatable about their ball center on the axis.

20 Claims, 2 Drawing Sheets

(51) Int. Cl.
*F16H 1/46* (2006.01)
*F16C 17/08* (2006.01)

(52) U.S. Cl.
CPC .......... *F16H 57/08* (2013.01); *F16C 2361/61* (2013.01); *F16H 57/082* (2013.01)

(56) References Cited

U.S. PATENT DOCUMENTS

| | | | | |
|---|---|---|---|---|
| 2,143,452 | A * | 1/1939 | Reynolds | F16H 61/0293 475/257 |
| 2,954,220 | A * | 9/1960 | Bergmann | E21C 27/22 198/664 |
| 4,865,529 | A | 9/1989 | Sutton | |
| 5,570,752 | A * | 11/1996 | Takata | B62M 6/45 180/206.2 |
| 6,129,648 | A * | 10/2000 | Tanioka | F16H 1/46 475/331 |
| 8,376,094 | B2 * | 2/2013 | Yamasaki | F16D 65/18 188/162 |
| 2005/0020401 | A1 * | 1/2005 | Ando | F16H 55/0806 475/344 |
| 2010/0084230 | A1 | 4/2010 | Yamasaki et al. | |
| 2015/0292601 | A1 * | 10/2015 | Tesar | F16D 13/26 475/149 |

* cited by examiner

TRANSMISSION, IN PARTICULAR FOR DRIVE SYSTEMS OF CONSTRUCTION MACHINES AND MINING MACHINES

CROSS-REFERENCE TO RELATED APPLICATIONS

This application is a National Stage of International Patent Application No. PCT/EP2013/001209, filed Apr. 23, 2013, which claims priority to foreign German Patent Application No. 20 2012 101 546.3, filed Apr. 25, 2012, the contents of which are incorporated herein by reference in their entirety.

TECHNICAL FIELD

The present disclosure generally relates to a transmission. Particularly, the transmission may be used in a drive system of construction machines and mining machines. In particular, the transmission may comprise a transmission housing and at least one transmission stage arranged in the transmission housing. The transmission stage may include, arranged coaxially with respect to an axis, a sun gear, a planet carrier with at least two planet gears rotatably mounted on the planet carrier, and an internal gear as transmission parts. The transmission may further comprise at least one stop means for limiting the axial movement of two transmission parts which are movable relative to one another.

The present disclosure relates preferably to a transmission for drive systems of construction machines and mining machines, in which relatively high levels of drive power must be attained in order, via a corresponding drive system, to drive chain wheels or chain sprockets by means of which for example the chain-belt of a face conveyor or a mining machine towed by means of a chain is moved along a coal face, in order to mine material at the coal face or transport said material away by means of the conveyor. The installed levels of drive power of corresponding drive systems are usually higher than 400 kW and corresponding drive systems must, while being of compact construction, ensure reliable start-up of the construction machine or mining machine and simultaneously be designed so as not to sustain damage even in the event of abrupt blocking of the driven chain. The present disclosure however also relates to transmissions for other purposes.

BACKGROUND

In transmissions having at least one transmission stage formed by a planetary gear set, it might be conventional for stop means to be inserted between mutually adjacent transmission parts which move relative to one another at different rotational speeds, which stop means limit the axial mobility of the two transmission parts rotating differently from one another.

In particular, in the case of planetary gear sets, the drive input pinion is often not axially fixed and must therefore be limited axially in terms of its mobility by stop means. Axial forces are generated in a planet stage of a planetary gear set, and friction is generated as a result of the combination of rotational speed difference and axial forces. The stop means may serve simultaneously to protect the sun gear or sun pinion, and, perhaps, it is conventional in the prior art for hardened stop discs, hardened spherical thrust pieces, axial bearing discs, deep-groove ball bearings or thrust pieces and stop discs composed of brass or bronze to be used as stop means. In transmissions for drive systems of construction machines and mining machines, use is normally made of spherical thrust pieces, axial bearing discs and/or thrust pieces composed of brass or bronze.

A generic transmission having a plurality of transmission stages and stop discs between the sun gear and further transmission parts is known for example from DE 10 2008 050 187 A1. In the generic transmission, the stop discs can be composed of different materials such as metal, metal alloy, plastic or Teflon™ and they are produced as punched parts which extend substantially over the entire surface of the face side of the planet carrier.

The applicant has, since 1995, marketed a transmission for drive systems for underground mining applications as the "CST drive system", which is described, for example, in DE 4316 798 Al. In said transmission, which is provided with a wet-running overload clutch, use is made, as stop means, either of thrust pieces arranged on the axis on both transmission parts and with a hardened spherical contact surface, or of annular hardened stop discs with Rockwell hardnesses of 58 to 62 HRC. The spherical thrust pieces and/or the stop discs are held in the face sides for example of the sun gear and of the planet carrier by means of special receiving elements in order to be exchangeable if necessary during maintenance of the transmission. A special receiving device which must be custom-made for every transmission type is however required. In particular owing to the increasing installed levels of drive power, the stop means are subjected to increased wear, as a result of which the operating duration of a corresponding transmission can be shortened.

The present disclosure is directed, at least in part, to improving or overcoming one or more aspects of prior systems.

SUMMARY OF THE DISCLOSURE

In an aspect of the present disclosure a transmission, in particular for drive systems of construction machines and mining machines, may comprise a transmission housing and at least one transmission stage arranged in the transmission housing. The transmission stage may include, coaxially with respect to an axis, a sun gear, a planet carrier with at least two planet gears rotatably mounted on the planet carrier, and an internal gear as transmission parts. At least one stop means for limiting the axial movement of two transmission parts which are movable relative to one another, may be provided. The stop means may comprise a ball pair with a first ball assigned to a first transmission part and a second ball assigned to a second transmission part. The two balls may be arranged so as to be rotatable about their ball centre on the axis.

Other features and aspects of this disclosure will be apparent from the following description and the accompanying drawings.

BRIEF DESCRIPTION OF THE DRAWINGS

Further advantages and refinements will emerge from the following description of an exemplary embodiment which is shown schematically in the drawing, in which.

DETAILED DESCRIPTION

Figure 1:
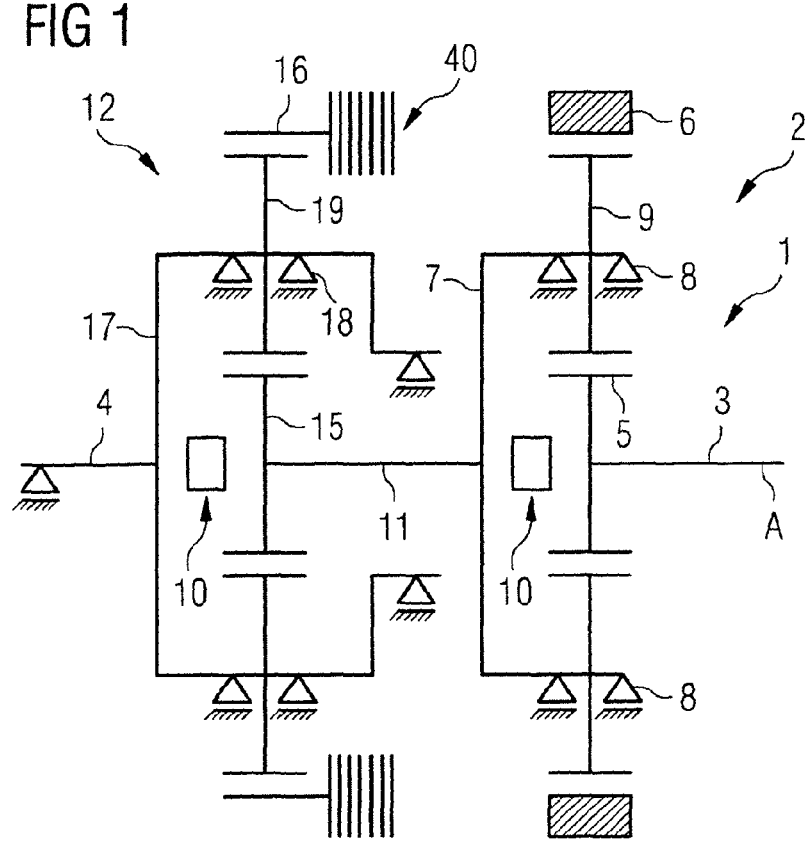
FIG. 1 schematically shows, on the basis of a transmission diagram, a transmission in particular for a drive system of a mining machine, having two transmission stages composed of planet stages, with a position of the stop means being schematically indicated.

FIG. 1 schematically shows, on the basis of a transmission diagram, the basic design of a transmission 1 having stop means 10 according to the present disclosure which are merely schematically indicated. The transmission 1 serves preferably as a drive system for a mining machine, and has a main transmission axis A, with in this case both an input shaft 3 and also a drive output shaft 4 being arranged centrally with their respective axes of rotation on said main transmission axis. There may be positioned upstream of the input shaft 3 for example an electric motor or the like, to which the input shaft 3 is generally detachably coupled. The left-hand end of the input shaft 3 forms a sun pinion or sun gear 5 of an input-side transmission stage 2, which is formed as a planetary gear set and which has a static internal gear 6 and a planet carrier 7 arranged so as to be rotatable about the axis A, on which planet carrier a plurality of planet gears 9 are mounted by means of wheel bearings 8, said planet gears meshing with the internal toothing of the internal gear 6. The planet carrier 7 of the first, drive-input-side transmission stage 2 connected rotationally conjointly to an intermediate shaft 11, which in turn is connected at the face side to a second sun pinion or sun gear 15 of a drive-output-side transmission stage 12. The drive-output-side transmission stage 12 has, in addition to the sun gear 15, also an internal gear 16, a planet carrier 17 and a plurality of planet gears 19 mounted on the planet carrier 17 by means of bearings 18, said planet gears in turn meshing by means of their planet toothing with the internal toothing of the internal gear 16. The planet carrier 17 of the drive-output-side transmission stage 12 is connected rotationally conjointly to the drive output shaft 4. For simplicity of the illustration, a housing in which the entire transmission 1 is accommodated is not shown.

Both the sun gear 5 of the first transmission stage 2 and also the sun gear 15 of the second transmission stage 12, the latter sun gear in this case being a constituent part of the intermediate shaft 11, are mounted on a floating manner in the transmission 1, and to limit the axial mobility of the intermediate shaft 11 and of the shaft 3 which bears the sun gear 5, in each case one schematically indicated stop means 10 is arranged between the face side of the sun gear 5, 15 and the end face of the intermediate shaft 11 or of the planet carrier 17. Both stop means 10 are arranged centrally on the axis A, as will now be explained with reference to FIG. 2.

Figure 2:
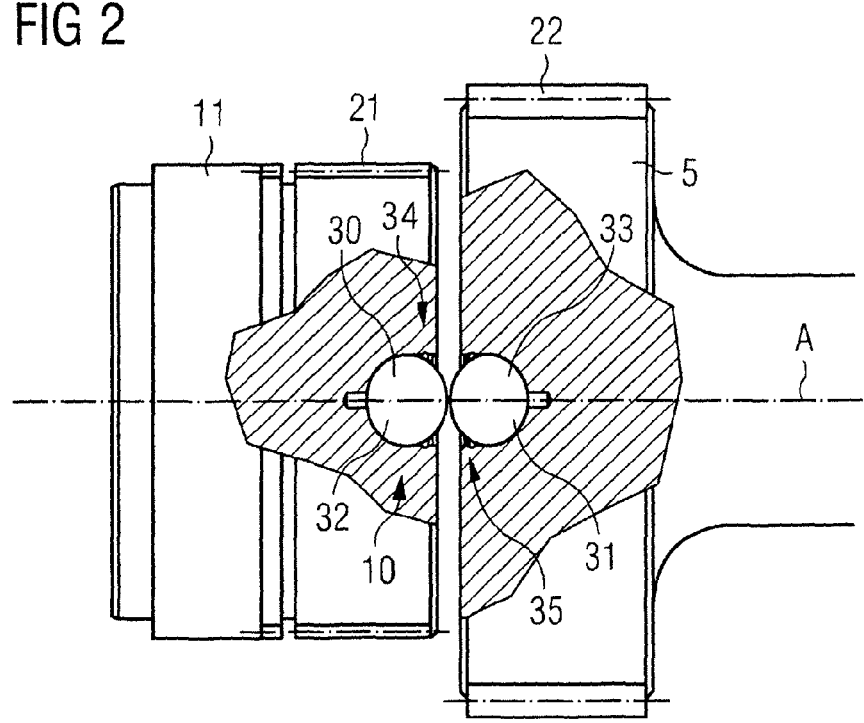
FIG. 2 schematically shows, on the basis of two adjacently situated transmission parts, an exemplary embodiment of the drive means according to the present disclosure.

FIG. 2 shows, by way of example, the design of the stop means 10 between the sun gear 5 of the first transmission stage and the face side of the intermediate shaft 11 of the second transmission stage. The planet carrier 7 (FIG. 1) of the first transmission stage is coupled rotationally conjointly to the toothing 21 of the intermediate shaft 11, while the planet gears (9, FIG. 1) of the first transmission stage mesh with the toothing 22 of the sun gear 5. As a stop means 10, there is provided centrally with respect to the axis A a ball pair which is composed of a first ball 30 and a second ball 31, wherein the first ball 30 is arranged in a depression, formed as a ball socket 32, in the face side of the intermediate shaft 11, and the second ball 31 is arranged in a depression or receptacle, formed as a ball socket 33, in the face side of the sun gear 5. Both balls 30, 31 are arranged with their ball central point on the axis A and are received in the ball sockets 32, 33 in such a way that they can rotate freely about their ball centre, that is to say in any spatial direction within the ball socket 32, 33. Both balls 30, 31 are held in the respective ball socket 32, 33 by means of a circlip 34 and 35 respectively which permits free rotatability of the balls 30, 31 about the ball centre. During the mounting of the balls 30, 31 into the ball sockets 32, 33, it is preferable for a sufficient amount of ball grease to be injected or introduced in order to attain low friction forces between the ball surface of the balls 30, 31 and the surface of the ball sockets 32, 33.

Figure 3:
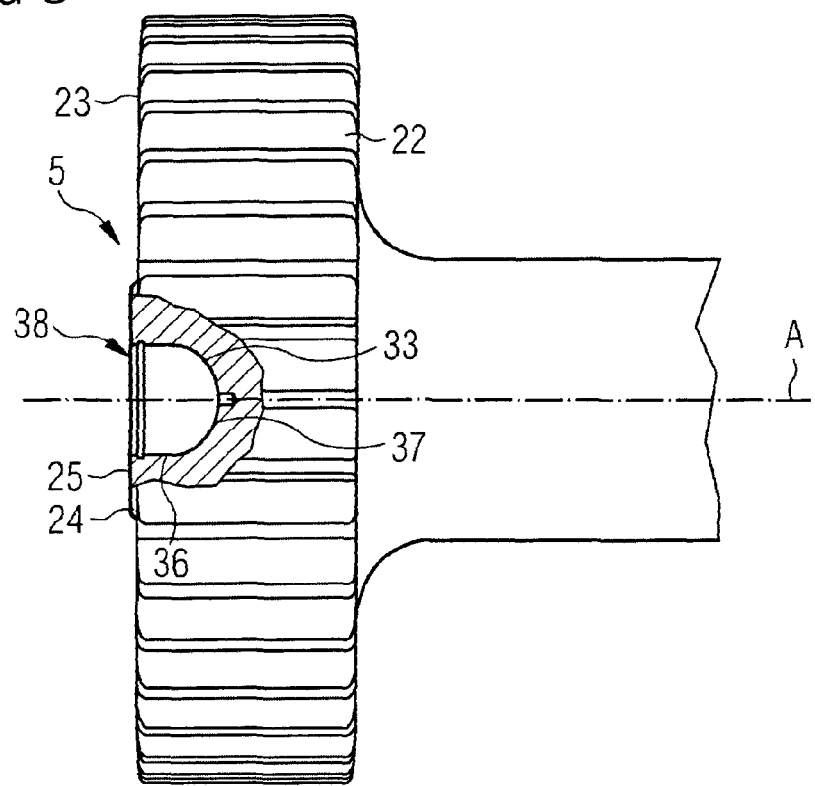
FIG. 3 shows, in a partially cut-away side view on the sun pinion of a sun gear, a ball socket for receiving a ball.
Figure 4:
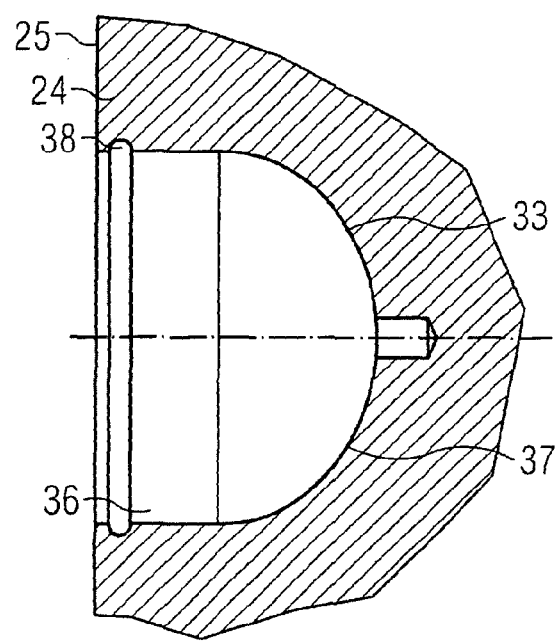
FIG. 4 shows a detail view of the ball socket from FIG. 3.

FIGS. 3 and 4, which will now be referred to, show the arrangement of the ball socket 33 in the sun gear 5 of the first transmission stage. The ball socket 33 is formed symmetrically with respect to the axis A and in this case is composed of a blind bore 36 with a rounded spherical base 37 and with a recessed groove 38 for receiving the circlip. On the face side 23 of the sun gear 5 there is formed a small protruding projection 24, the face side 25 of which surrounds the ball socket 33. The depth of the ball socket 33 is selected such that, when a ball is inserted, said ball protrudes only slightly, and preferably with considerably less than ¼ of its ball diameter, beyond the face side 23 of the sun gear 5 or the face side 25 of the elevation 24. As can be seen in FIG. 2, it is generally sufficient for each of the two balls 30, 31 to protrude with approximately ¼ to ¼ of its ball diameter beyond the face side.

The ball socket in the planet carrier of the second transmission stage may be arranged directly in the face side of the planet carrier or in the face side of a shaft or drive output shaft which holds the planet carrier 17 of the second transmission stage.

For the particularly preferred use of the transmission 1 according to the present disclosure as a drive system for mining machines, the internal gear 16 is, as shown in FIG. 1, assigned a switchable slipping clutch 40 as an overload clutch, which clutch can be actuated by means of a control device (not shown) and is formed preferably as a wet-running multi-plate clutch operated in particular with oil. By activation of the overload clutch, it is possible, for a start-up of the transmission 1, for the rotational speed of the internal gear 16 to be varied, whereby, with the clutch 40 open and the internal gear 16 rotating conjointly, the transmission 1 can start up without load. During operation, the overload clutch 40 can be opened or can slip, for example in the event of the drive output shaft 4 being blocked, in order to protect the transmission against damage. Corresponding functional possibilities and functional enhancements of an overload clutch 40 in a corresponding drive system are known to a person skilled in the art from the prior art, for which reason no further description will be given here.

INDUSTRIAL APPLICABILITY

There will emerge to a person skilled in the art from the above description numerous modifications which will fall within the scope of protection of the appended claims.

A transmission as described herein may be used to lengthen the operating duration without maintenance, to simplify the maintenance complexity and to permit higher levels of drive power.

In an exemplary embodiment of the present disclosure, two balls which are arranged on an axis and which abut against one another on the axis may be duly subjected to point loads, but because both balls of the ball pair are inserted movably in a receptacle and can rotate in the associated receptacle, contact pairs on the ball surface of one ball and on the ball surface of the other ball change constantly during operation. In effect, therefore, the entire ball surface may form a wear surface, and a situation may be prevented in which always the same surfaces abut against one another and are thus subject to an increased risk of wear, as is the case in the previously used stop means.

In another exemplary embodiment of the present disclosure, it might be advantageous in particular for at least one ball pair to be arranged such that one ball is arranged on the sun gear or on a shaft which holds the sun gear, because the sun gear or sun pinion is generally mounted in an axially floating manner in the transmission.

It is basically possible for the solution according to the present disclosure, with a ball pair on two transmission parts as stop means, to be used in all transmissions, in particular in all transmissions having at least one planet stage. Particular advantages may be attained in transmissions with a plurality of transmission stages, wherein it is preferable for a ball pair to be arranged in each case between two transmission stages. In the case of a transmission having a plurality of transmission stages, all of the ball pairs may be arranged on the same axis. It is furthermore preferable for the ball pair to be arranged in each case between the sun gears, or between the shafts which hold the sun gears, of different transmission stages. At least one ball pair may also be arranged between the sun gear, or a shaft which holds the sun gear, and the planet carrier of the same transmission stage.

For all possible exemplary embodiments of the present disclosure, it might be advantageous in particular for the balls to be received in ball sockets, formed integrally on the transmission parts, as ball receptacles. A corresponding ball socket may advantageously be composed of a bore which is formed integrally on the transmission part and which has a spherical base, wherein this can be formed on the respective transmission parts with relatively little outlay. It might be advantageous in particular for the face side of a sun gear, or the face side of a shaft which holds the sun gear, to be provided with a corresponding ball socket for rotatably receiving a ball.

In another exemplary embodiment of the present disclosure, it might be preferable for the balls in the ball socket to protrude beyond the face side of the associated transmission part by less than the ball radius or less than half of a ball diameter, preferably by less than ¼ of a ball diameter.

As an alternative to ball sockets formed integrally in the transmission parts, the balls may also be received, so as to be rotatable about their ball centre, in a cage which is preferably detachably fastened to a transmission part.

In a further exemplary embodiment of the present disclosure, the balls may be of different diameter depending on the size of the transmission parts and may be composed of different materials depending on the expected loadings. For some transmission types, it may be advantageous to use balls composed of hard metal. Balls composed of hard metal have high compressive strength, high impact resistance and high wear resistance, and may have "ROCKWELL" hardnesses of approximately 90 HRT.

The balls may alternatively be composed of a ceramic material such as for example a silicon nitride ($Si_3N_4$). Corresponding balls can be produced with high precision and manage with little lubrication. Ceramic balls do not corrode, have high breaking strength and a high modulus of elasticity, and are temperature-resistant to approximately 1000° C. The "ROCKWELL" hardness may be approximately 78 HRC. The balls could alternatively be composed of a ceramic aluminum oxide ($Al_2O_3$), which duly has a slightly lower "ROCKWELL" hardness of approximately 70 HRC but instead has an even higher temperature resistance of for example up to 1800° C.

For the particularly preferred field of use, specifically drive systems for construction machines and mining machines, it might be advantageous in particular for the transmission to be provided with a switchable slipping clutch as an overload clutch, said clutch being assigned to a drive-output-side, rotatably mounted internal gear. The overload clutch may in particular be formed by a multi-plate clutch, preferably a wet-running multi-plate clutch.

The size of the balls used may dependent on the structural size of the individual transmission parts. The ball pairs may also be arranged between other transmission parts which move relative to one another within the individual transmission stages, or between transmission parts of different stages. Corresponding stop means with ball pairs may also be arranged at other positions in the transmission, if the two transmission parts are rotatable relative to one another about the possible contact surface.

The transmission could also be provided with more than two transmission stages or with only one transmission stage.

The ball sockets could also be formed in attachment parts, or the balls are received in cages which are detachably fastened to the respective transmission part.

The balls of the ball pairs may also be composed of different materials from one another.

Although the preferred embodiments of this present disclosure have been described herein, improvements and modifications may be incorporated without departing from the scope of the following claims.

The invention claimed is:

1. A transmission, in particular for drive systems of construction machines and mining machines, comprising:
  a transmission housing;
  a plurality of transmission stages arranged in the transmission housing, at least one of the plurality of transmission stages including, coaxially with respect to an axis, a sun gear, a planet carrier with at least two planet gears rotatably mounted on the planet carrier, and an internal gear as transmission parts; and
  at least one stop means for limiting the axial movement of two transmission parts which are movable relative to one another, the stop means comprising at least one ball pair with a first ball assigned to a first transmission part and a second ball assigned to a second transmission part, wherein the two balls are arranged so as to be rotatable about their ball centre on the axis, wherein the at least one ball pair comprises a plurality of ball pairs, each arranged between each of the plurality of transmission stages.

2. The transmission according to claim 1, wherein at least one ball is arranged on the sun gear or on a shaft which holds the sun gear.

3. The transmission according to claim 1, wherein all of the plurality of ball pairs are arranged on the same axis.

4. The transmission according to claim 1, wherein each of the ball pairs arranged between each of the plurality of transmission stages are arranged between the sun gears, or between the shafts which hold the sun gears, of the plurality of transmission stages.

5. The transmission according to claim 1, wherein the at least one ball pair is arranged between the sun gear, or a shaft which holds the sun gear, and the planet carrier of the same transmission stage.

6. The transmission according to claim 1, wherein the first ball is received in a first ball socket formed integrally on the first transmission part, and the second ball is received in a second ball socket formed integrally on the second transmission part.

7. The transmission according to claim 6, wherein the first ball in the first ball socket protrudes beyond a face side of the first transmission part by less than half of the first ball diameter.

8. The transmission according to claim 7, wherein the first ball protrudes beyond the face side by less than ¼ of the first ball diameter.

9. The transmission according to claim 6, wherein the second ball in the second ball socket protrudes beyond a face side of the second transmission part by less than half of the second ball diameter.

10. The transmission according to claim 9, wherein the second ball protrudes beyond the face side by less than ¼ of the second ball diameter.

11. The transmission according to claim 1, wherein a face side of the sun gear, or a face side of a shaft which holds the sun gear, are provided with a ball socket for rotatably receiving a ball.

12. The transmission according to claim 1, wherein at least one of the first ball and the second ball is received, so as to be rotatable about its ball centre, in a cage detachably fastened to at least one of the first transmission part and the second transmission part, respectively.

13. The transmission according to claim 1, wherein the first and second balls are composed of hard metal.

14. The transmission according to claim 1, wherein the first and second balls are composed of a ceramic material.

15. The transmission according to claim 14, wherein the ceramic material comprises a silicon nitride or an aluminum oxide.

16. The transmission according to claim 1, further comprising a switchable overload clutch which is assigned to a drive-output-side, rotatably mounted internal gear.

17. The transmission according to claim 16, the overload clutch being formed by a multi-plate clutch.

18. A transmission, in particular for drive systems of construction machines and mining machines, comprising:
  a transmission housing;
  at least one transmission stage arranged in the transmission housing, the transmission stage including, coaxially with respect to an axis, a sun gear, a planet carrier with at least two planet gears rotatably mounted on the planet carrier, and an internal gear as transmission parts; and
  at least one stop means for limiting the axial movement of two transmission parts which are movable relative to one another, the stop means comprising a ball pair with a first ball assigned to a first transmission part and a second ball assigned to a second transmission part, wherein the two balls are arranged so as to be rotatable about their ball centre on the axis, and wherein the ball pair is arranged between the sun gear or a shaft that holds the sun gear, and the planet carrier.

19. The transmission according to claim 18, wherein the first ball and the second ball are each received in first and second sockets, respectively, on the first and second transmission parts, respectively.

20. The transmission according to claim 18, wherein the first ball protrudes beyond a face side of the first transmission part by less than half of a first ball diameter.

* * * * *